Feb. 6, 1962    TADASHI UENO    3,019,706
FINE ADJUSTMENT MECHANISM FOR MICROSCOPES
Filed Feb. 25, 1958

INVENTOR.
TADASHI UENO
BY
ATTORNEY

United States Patent Office 3,019,706
Patented Feb. 6, 1962

3,019,706
FINE ADJUSTMENT MECHANISM FOR MICROSCOPES
Tadashi Ueno, Setagaya-ku, Tokyo, Japan, assignor to Nippon Kogaku K.K., Tokyo, Japan, a corporation of Japan
Filed Feb. 25, 1958, Ser. No. 717,523
7 Claims. (Cl. 88—39)

This invention relates to microscopes and more particularly to the fine adjustment mechanism thereof for adjusting the microscope objective relative to the object or specimen on the stage accurately to focus the objective being used on such specimen.

The instant application is a continuation-in-part of my application for patent, Serial Number 517,553, filed June 23, 1955, now abandoned.

An object of the instant invention is to provide a fine adjustment mechanism for focussing the objective of a microscope accurately after the objective has been brought roughly into focus by the coarse adjustment mechanism in which, when it is desired or convenient to change the specimen or slide on the microscope stage, swinging the microscope nosepiece out of the accurate focussing position is possible and restoring it to such position without requiring a refocussing by the fine adjustment mechanism.

A further object of the instant invention is to decrease, and eliminate, the possibility of breaking either the objective lens or the cover glass of the specimen should the lens strike the cover glass under the force of a powerful spring pushing the microscope tube downwardly, by replacing the customary vertical sliding of the microscope tube for the fine adjustment by a limited rotary or tilting motion.

I accomplish the foregoing, and other obvious, objects by supporting the arm or nosepiece carrying the microscope objectives wholly and entirely on an elastic bridge rotatable or twistable in torsion, the bridge extending at right angles to the axis of the arm and being coplanar with the top surface of the glass of a specimen on the microscope block. The bridge is integral with and extends diametrically across an annular ring which is clamped in place to the top of a hollow microscope pedestal by any convenient means, for example, an apertured cover having internal threading on a depending, integral flange, by which the cover is screwed onto the pedestal to clamp the ring to the top surface of the pedestal. A central spacer projection on the arm surface adjacent the bridge provides the necessary clearance and space from the pedestal to permit a limited amount of tilting of the arm as the bridge is twisted in torsion. The fine adjustment is by means of an elongated rod dependent from the bridge within the hollow pedestal which is engaged by a cam on a rotatable shaft extending through the pedestal and threaded thereinto by microscopic threads; the rotatable cam shaft being to that side of the rod opposite to the direction in which the objective arm extends from the torsional bridge and having knobs on its ends exterior to the pedestal for rotating it manually. The weight of the objective carrying arm thus continuously forces the elongated rod against the cam surface, of which weight a substantial portion is counteracted by the tension of a compression spring acting against the free end region of such rod. The lower free end of the rod may be engaged by a lever manually operable to move the free end of the rod in the direction opposite to which the weight objective arm tends to move it, and on such movement the objective carrying arm is tilted away from specimen on the microscope block.

The foregoing, and other, objects and features of the instant invention will be more readily understood from the illustrative embodiment thereof shown in the appended drawing in which.

Figure 4:
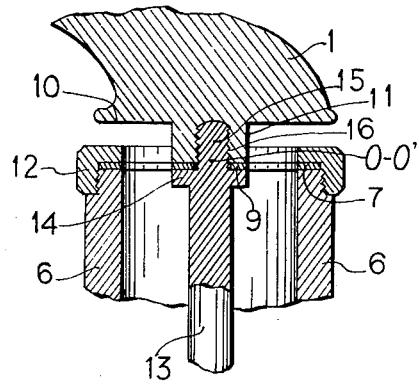
Figure 5:
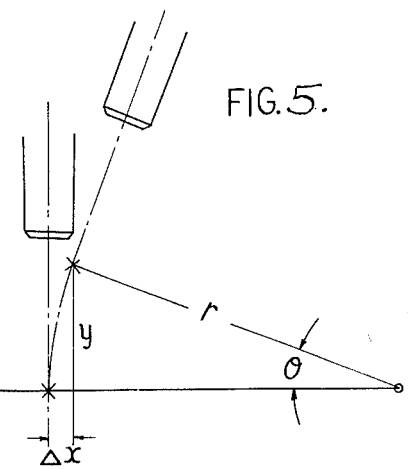

FIGURE 4, a section perpendicular to the axis of the balancing torsional spring of the portions of the objective arm and fine adjustment mechanism to more clearly show the connection of the parts with such balancing spring; and FIGURE 5, a diagrammatic showing of the objective in two positions of travel determined by the fine focusing mechanism.

Figure 3:
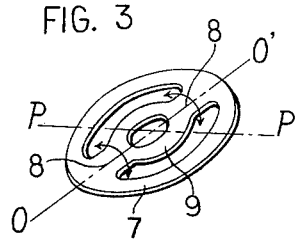
FIGURE 3 shows in perspective the balancing torsional spring of the mechanism.

Referring to the drawing, the microscope comprises an arm 1 on the free end of which supports the microscope tube 2 provided with a plurality of objectives 3 mounted on a turret, and a specimen platform or stage 4 which may be vertically raised or lowered by a coarse adjustment mechanism 5, of the prior known and usual type and guided on the pillar 6. Pillar 6 is hollow, with its bottom affixed to the microscope base and is of a height such that its upper end or surface is substantially in the horizontal plane P—P' of the surface of the microscope stage in its substantially uppermost position to which it may be carried by the coarse adjusting mechanism. To the top of the pillar 6 there is clamped an annular ring 7 of sheet beryllium copper which is sufficiently strong so that the whole weight of arm 1, and the elements supported at its free end, may be supported on a bridge 8 integral with ring 7, and yet sufficiently thin so that the ends of the bridge 8 may be twisted. The bridge 8 extends across the ring 7 at right angles to the direction in which arm 1 extends from the pillar over, and spaced from, the specimen platform so that the axis of the microscope tube in its normal viewing position is aligned with the center of the specimen platform. The central portion 9 of bridge 8 is in the form of an annular ring defining a central aperture concentric with ring 7. The end surface 10 of arm 1 is substantially horizontal and has an integral cylindrical projection 11 depending therefrom of a diameter not exceeding the outer diameter of the central ring portion 9, to space the arm 1 from the top of pillar 6 so that arm 1 may move in rotary motion, as indicated by the arrows in FIGURE 3, about the neutral axis O—O' centrally of the bridge 8 as the latter twists as the result of the forces applied thereto as below described.

Annular plate 7 is clamped to the top of pillar 6 by cover member 12 (FIGURES 2 and 4) defining an aperture concentric with ring 7 of a diameter substantially equal to the internal diameter of ring 7, the cover member having an integral cylindrical flange which is internally threaded to be screwed onto the externally upper portion of pillar 6. An elongated rod 13, of a diameter substantially less than the internal diameter of pillar 6 and of a length less than the height of pillar 6, has a shoulder 14 near its upper end, of a diameter not in excess of the outer diameter of central portion 9 of the bridge 8, and a threaded upper end region 15 above shoulder 14 which is of a diameter less than that of the aperture of central portion 9. Projection 15 extends through the aperture of central portion 9 and is threaded into the internally threaded bore 16 of projection 11 of arm 1, so as to clamp central portion 9 of bridge 8 firmly between the lower face of projection 11 and the upper face of shoulder 14. Thus, each the central portion 9 and the annular ring 7 are firmly clamped in place, only the end portions of bridge 8 therebetween are free to move to a limited extent in twist or torsion about neutral axis O—O' defined by the gridge 8, which thus functions as an elastic pivot. Due to its weight, the centrally attached arm 1 tends to rotate counterclockwise in FIGURE 1 but is kept normally upright by the engagement betwen a lower portion of elongated rod 13, suspended from central bridge portion 9, with a cam 17 for the fine adjustment.

Figure 1:
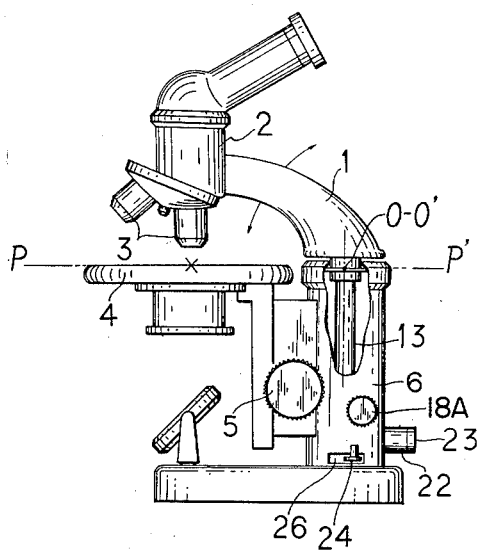
FIGURE 1 shows an elevation of a microscope incorporating the fine adjustment mechanism of the instant invention with a portion of the hollow microscope pillar broken away.
Figure 2:
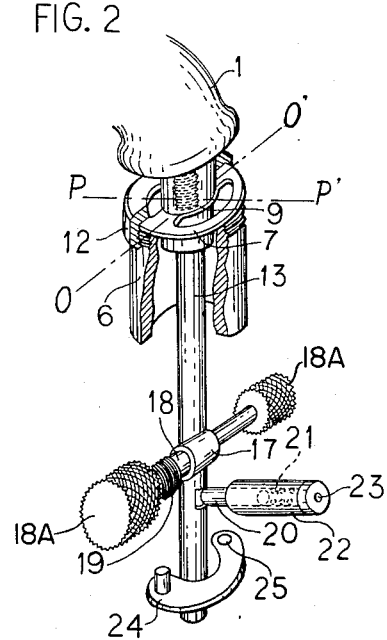
FIGURE 2 shows in elevational perspective, with the pillar partially broken away, the essential elements of the fine adjustment mechanism within such pillar.

As shown in FIGURES 1 and 2, the fine adjustment cam 17 is mounted on a shaft 18 extending transversely through the pillar 6 to the right of elongated rod 13 to act as a stop for the counterclockwise movement, the cam 17 itself being conical and shiftable transversely of rod 13 by means of the micrometer screw 19 cooperating with a threaded bore in and through the wall of pillar 6 and mounted on shaft 18 having knobs 18A on its exterior ends for facility of access to make adjustments. The variation in the lift of the conical cam region in engagement with rod 13 pushes rod 14, swinging supporting arm 1, or permitting arm 1 to swing accordingly, about the neutral axis O—O' by twisting the end regions of bridge 8. A piston 20, actuated by a compression spring 21 with a cylinder 22, bears against the lower end region of rod 12 to decrease the counterclockwise torque resulting from the weight of the solid supporting arm 1 and the microscope tube 2 and objectives 3 carried thereby. Cylinder 22 in its closed end region is provided with air damping aperture 23 to control the rate of the restoring movement of the piston 20.

The automatic focusing restoration lever 24 has one end thereof pivoted and a pin 25 within pillar 6 and its free end extends through a horizontal slot 26 in the wall of pillar 6, and normally is pushed to the extreme right of the slot in which position, lever 24 does not engage the lower end region of rod 13. Lever 24 is of such configuration and position relative to rod 13 that when its free end is pushed to the left in its slot 26 (in FIG. 1) rod 13 is carried clockwise, no mtater which particular portion of cam 17 it may at the time be engaging, rotating arm 1 clockwise and lifting the objective out of its focussed position. When thereafter, lever 24 is moved to the right in its slot 26, rod 13 is freed of restraint by the lever and pivots back to its original position, as does arm 1 with it. There is thus no need for refocusing of the objective. It will be noted that the piston 20 under the pressure of spring 21 has followed rod 13 to the left, and when lever 24 is moved to the right the rod 13 and arm 1 will restore against such spring pressure with the speed of restoration under the control of the air damping aperture 23, preventing impact both against cam 17 and of the objectives on the specimens on the microscope stage.

In the fine adjustment mechanism for microscopes of the instant invention, the objectives move along an arc of a circle while necessarily they should move along a straight line perpendicular to the microscope stage. In view thereof, consideration should be given to possible sources of difficulty and whether such can be disregarded. Two are of interest; firstly, lateral motion $\Delta x$ of the image in the field of view, and secondly, optical defects due to inclination $\theta$ of the optical axis.

The first possible source of difficulty can be neglected where the neutral axis O—O' is positioned in the horizontal plane of the surface of the microscope stage or slide glass and is perpendicular to the optical axis of the objective in focus. Referring to FIGURE 5

$$y = r \sin \theta \text{ and } \Delta x = \frac{y^2}{2r}$$

Assuming $r=100$ mm. and vertical movement $=\pm 0.5$ mm.

$$\sin \theta = \frac{0.5}{100} = .005 \text{ and } \theta = 0°17'$$

$$\Delta x = \pm 1.25 \text{ micron}$$

Hence, $\Delta x$ can be disregarded as negligibly small.

The second possible source of difficulty can be avoided by decreasing the characteristics and the angle of inclination $\theta$ of the microscope objective. More specifically, a microscope objective has conspicuous spherical aberration within the field of view and hence only its central portion, which appears flat, is undistorted, becoming more and more distorted as the peripheral regions thereof are approached, that is, in conventional microscopes the region of undistorted field is relatively small, being limited to the central region of from 30% to 50% of the field of view. With the maximum inclination of the optical axis limited to 0°17', the center of the undistorted region of the field of view deviates approximately 5%, which results in no alteration of the undistorted area and causes absolutely no practical difficulty. Obviously where the specimen has a thickness of but a few microns, this difficulty can be entirely neglected.

What I claim is:

1. A fine adjustment mechanism for focusing the objective of microscopes, comprising an angle arm of which the free end supports at least one objective, a hollow vertical pillar, an annular plate of spring metal attached to the upper end of the pillar, a bridge of spring plate metal extending across the annular plate and having its ends integral with diametrically opposite peripheral regions of the annular plate, means affixing the central portion of the adjacent end of the angle arm to a central portion of the bridge so that a free intermediate region of the bridge extends from each side of the bridge central portion to the adjacent end of the bridge integral with the annular plate and the adjacent end of the angle arm is spaced from the top of the pillar to permit tilting of the angle arm about the bridge as an axis, the axis of the bridge being perpendicular to the direction in which the free end of the angle arm extends from the pillar, an elongated rod rigid with the central portion of the bridge and the adjacent end of the angle arm and normally extending vertically within the pillar and of a diameter less than the parallel interior dimension of the pillar, a rotatable shaft externally threaded in the cylindrical portion thereof supported in the pillar wall and extending across the hollow interior of the pillar to the side of the rod opposite to that in which the free end of the angle arm extends from the pillar, and a conical cam integrally mounted on the rotatable shaft and coaxial therewith engaging the rod with its conical cam surface.

2. A fine adjustment mechanism according to claim 1 in which the annular plate is substantially in the horizontal plane of the upper surface of the microscope stage, the stage being adjustable to said plane by the coarse adjustment mechanism of the microscope.

3. A fine adjustment mechanism according to claim 1 in which a piston has its free end positioned against an intermediate region of the rod to the same side of the rod as the rotatable shaft, a cylinder in which the piston slides being spatially fixed in the interior of the pillar with the other end of the piston spaced from the corresponding cylinder end, and a compression spring within the cylinder in the space between such other piston end and such cylinder end and so biasing the piston from such cylinder end that the free end of the piston constantly engages the rod in opposition to the tendency of the rod to pivot in the direction toward the piston under the weight of the angle arm.

4. A fine adjustment mechanism according to claim 3 in which the end of the cylinder at which the compression spring is situate defines an air damping aperture.

5. A fine adjustment mechanism according to claim 1 in which an arcuate lever is pivoted within the pillar so that it is swingable about a lower end region of the suspended rod from and into engagement with the rod, an aperture through the pillar wall through which the free end of the lever extends, the lever intermediate region being normally spaced from the rod and to the same side of the rod as the shaft and cam and being pivotable in the opposite direction to engage the rod and tilt the rod an amount sufficient to tilt the angle arm a maximum amount in the direction moving the objective away from the specimen stage.

6. In a microscope having a hollow pillar, an objective, an angle arm supporting the objective, and a stage on which slides to be examined may be moved by a coarse adjustment mechanism to bring the slide into approximate focus in the horizontal plane of the top of the pillar, the improvement in the fine adjusting mechanism to bring said slide into accurate focus comprising a flat plate spring bridge across the open top end of the pillar along the diameter thereof substantially perpendicular to the direction in which the angle arm projects from the pillar, means rigidly affixing both ends of the flat spring bridge to the pillar, the central portion of the lower end of the angle arm being fixed to the central portion of the flat spring bridge so that the peripheral portions of the angle arm affixed end are spaced from the top of the pillar and so that regions of the bridge intermediate its central portion and its fixed ends can flex in torsion about the length axis of the bridge, an elongated member suspended from the central portion of the bridge within the pillar and of dimensions substantially smaller than the internal dimensions of the pillar parallel thereto, a rotatable shaft extending transversely through the pillar to the side of the elongated member opposite to that in which the angle arm extends from the pillar, micrometer threads on at least one end region of the shaft screwed into the pillar, a conical cam rigidly on the shaft and coaxial therewith of which the conical surfaces engages a first intermediate region of the side of the elongated member opposite to that in which the angle arm extends from the pillar, a piston engaging a second intermediate region of the side of the elongated member opposite to that in which the angle arm extends from the pillar, a compression spring biasing the piston and tending to maintain the elongated member in vertical position in opposition to the turning moment about the torsionally flexible bridge of the angle arm, and a manually operable pivoted lever to the side of the elongated member opposite to that in which the angle arm extends from the pillar normally spaced from its lower free end region and adapted on actuation to engage the elongated member to swing it about the bridge to disengage from the conical cam and simultaneously to swing the angle arm free end up to a predetermined position on an arc in the direction away from the stage.

7. The improvement in a microscope according to claim 6 in which the end regions of the flat spring bridge are integral with a first annular plate of spring material, the pillar is cylindrical with the upper end portion of its cylindrical outer surface threaded, a centrally apertured cover is threaded to the upper end of the pillar cylindrical surface clamping the first annular plate to the top of the pillar, the central portion of the flat spring bridge is a second annular plate, the elongated member is a cylindrical rod having a threaded upper end and a shoulder immediately therebelow, the threaded rod end being of a diameter fitting through the central aperture of the second annular plate, and an internally threaded spacer block is centrally integral with the lower end face of the angle arm of a diameter not in excess of the outer diameter of the second annular plate and adapted to be screwed on the threaded upper end of the rod to clamp the second annular plate between the lower face of the spacer block and the shoulder of the rod.

References Cited in the file of this patent

UNITED STATES PATENTS

| 328,277 | Bausch | Oct. 13, 1885 |
| 754,954 | Dieckmann | Mar. 15, 1904 |
| 1,529,102 | Wingren | Mar. 10, 1925 |
| 2,229,748 | Lawrence | Jan. 28, 1941 |
| 2,439,525 | Ott | Apr. 13, 1948 |
| 2,677,987 | Gallasch | May 11, 1954 |
| 2,763,185 | Dentscher | Sept. 18, 1956 |